United States Patent [19]
Stadtfeld et al.

[11] Patent Number: 5,901,454
[45] Date of Patent: May 11, 1999

[54] METHOD OF MESHING GEARS

[75] Inventors: Hermann J. Stadtfeld; Tedla Shiferaw, both of Rochester, N.Y.

[73] Assignee: The Gleason Works, Rochester, N.Y.

[21] Appl. No.: 08/922,154

[22] Filed: Sep. 2, 1997

[51] Int. Cl.$^6$ .................................................. G01M 13/02
[52] U.S. Cl. .......................... 33/501.13; 73/162; 451/47
[58] Field of Search .................. 33/613, 626, 501.7, 33/501.13; 29/428, 429; 73/162; 451/47

[56] References Cited

U.S. PATENT DOCUMENTS

| | | | |
|---|---|---|---|
| 1,981,693 | 11/1934 | Firestone et al. | 33/501.13 |
| 2,150,313 | 3/1939 | Bauer | 451/47 |
| 3,579,803 | 5/1971 | Lautenschlager | 451/47 |
| 3,604,120 | 9/1971 | Müller | 33/501.13 |
| 3,605,467 | 9/1971 | White et al. | |
| 3,611,800 | 10/1971 | Howlett et al. | 73/162 |
| 3,712,000 | 1/1973 | Spear | 73/162 |
| 3,717,958 | 2/1973 | Ellwanger et al. | 451/47 |
| 3,724,042 | 4/1973 | Raess et al. | |
| 3,795,143 | 3/1974 | Deprez et al. | 73/162 |
| 5,511,414 | 4/1996 | Nakamura et al. | |
| 5,609,058 | 3/1997 | Gnadt et al. | 73/162 |

FOREIGN PATENT DOCUMENTS

| | | |
|---|---|---|
| 4313533 | 10/1994 | Germany . |
| 9701749 | 1/1997 | WIPO . |

OTHER PUBLICATIONS

Stadtfeld, Hermann J., "Single Flank Test, 3–D Vibration Analysis and Digital Imaging of Tooth Contact with PHOENIX® 500HCT", The Gleason Works, Rochester, New York, Jun. 1995.

Pritschow et al., "Dreidimensionale Echtzeit–Kollisionsüberwachung an Fertigungseinrichtungen" *Werkstattstechnik, Zeitschrift Fur Industrielle Fertigung*, Berlin, vol. 77, No. 4, Apr. 1987, pp. 201–205.

*Primary Examiner*—G. Bradley Bennett
*Attorney, Agent, or Firm*—Robert L. McDowell

[57] ABSTRACT

A method of bringing a gear member and a pinion member into mesh with one another without causing damage to either or both members. Each of the members of the gear pair has an axis of rotation and a plurality of teeth with respective topland surfaces with at least one of the members having teeth, and thus toplands, extending lengthwise at an angle with respect to the axis of rotation of said member. The method comprises moving one member of the gear pair from a pre-mesh position relatively toward the other member of the gear pair along a meshing path which includes relative movement along (1) a sliding path oriented in the direction of the angle of the toplands and (2) along an axial path in the direction of the gear member axis whereby upon contact between any topland surfaces of the members, rotation of at least one of the members will result thus enabling the teeth to be relatively positioned so that meshing occurs. The method further contemplates rotating at least one of the members simultaneously with the relative movement along the meshing path.

24 Claims, 5 Drawing Sheets

METHOD OF MESHING GEARS

FIELD OF THE INVENTION

The present invention is directed to gears. In particular, the present invention is directed to a method of bringing mating members of a gear pair into mesh with one another in a way that damaging collisions of the toplands are prevented.

BACKGROUND OF THE INVENTION

On testing and/or lapping machines for gears, such as bevel or hypoid gears, the pinion and gear members are moved together to bring the pair into mesh, i.e. the pinion teeth engage the tooth slots of the ring gear and/or vice versa. Once they are engaged, the pinion and gear can be moved together to the proper position and can then be rolled together in a desired testing or lapping procedure. Computer controlled multi-axis lapping and testing machines are well known and are readily available. Such machines are shown and described in, for example, U.S. Pat. No. 5,609,058 to Gnadt et al. and in Stadtfeld, Hermann J., "Single Flank Test, 3-D Vibration Analysis and Digital Imaging of Tooth Contact with PHOENIX® 500 HCT", The Gleason Works, Rochester, N.Y., June 1995.

In moving the gear members relative to one another to bring them into mesh, collisions between the toplands of the meshing may cause damage to machine components especially if a direct topland-to-topland collision occurs. If the collision is such that the toplands are offset from one another, chipping of the topland edges may occur especially if the gear is hardened. This situation can lead to chips staying between the teeth during subsequent rolling of the gear pair. In this instance, the chips are rolled into the surface of the teeth and scoring the gear set thus results. If the gears are not hardened and an offset topland-to-topland collision occurs, plastic deformation of the topland edges may result in which subsequent rolling may damage the gear set or at least it is necessary to remove the deformation (nick) by hand.

Methods have been proposed in an effort to properly bring mating gear members into mesh in machining or testing operations. Manual feeding of one member relative to another to bring mating members into mesh is well known. In this method, one member is incrementally fed toward the other member and as contact nears, rotational adjustments of one member are made such that the teeth of one member may engage the tooth slots of the mating member. While this method is reliable, it is extremely slow.

In the method disclosed in U.S. Pat. No. 2,150,313 to Bauer, a lever having an attached pin and dog is swung toward a pinion member and a ring gear-shaped shaving tool to which is mounted a backing plate having notches which are aligned with the tooth spaces of the shaving tool. The dog has a wedge-shaped nose portion and the notches have wide openings which converge rearwardly toward the back of the backing plate. The pin is inserted into a tooth space of the pinion which may require a manual rotational adjustment to align the pin with a pinion tooth slot. If the tool and pinion are positioned properly for meshing, the dog will simultaneously enter a notch of the backing plate. If the dog does not align directly with a notch in the backing plate, one of the sides of the nose portion of the dog will engage an inclined surface of a notch resulting in a small rotation of the tool as the dog becomes fully engaged with the notch. Once full engagement is achieved, the pinion and tool will be properly aligned. This method is also quite time consuming.

In U.S. Pat. No. 3,579,803 to Lautenschlager, a bevel gear pair to be lapped are brought into mesh by feeding one gear relatively toward the other. However, if contact of the tooth toplands occurs, the members of the gear pair are separated, the rotational position of one member is incrementally adjusted and the members of the gear pair are again brought into contact. The process is repeated if necessary. Also disclosed in this patent is a method of meshing wherein instead of separating members of a pair upon collision, one of the members is rotated to bring about proper alignment. While it is disclosed that a pressure relief valve is included to prevent build-up of heavy forces, either of these methods presents a risk of damage to the machine and/or gear members since a collision is permitted to occur before the inventive method is utilized.

Known from U.S. Pat. Nos. 3,717,958 to Ellwanger et al. and 3,795,143 to Deprez et al. are respective lapping and testing machines wherein during initial meshing, one member of the gear pair is rotated to facilitate the meshing process. However, this method is somewhat random as there is no control of the rotational positioning of either of the gear pair members to attain a proper meshing alignment. Thus, collisions may still be expected.

In some automatic CNC machines, another attempt to avoid damage due to collisions between tooth toplands during meshing is to include a spring-loaded device on a machine wherein movement of the spring is indicative of a topland collision. Although the gear members have collided, the machine components continue their programmed movement until movement of the spring alerts the machine controller to activate a particular slide to free the pinion and gear and rotate the ring gear a fraction of a pitch after which the machine will attempt to mesh the gear pair again. Although this procedure reduces many instances of damage, the procedure still permits forces to build in the machine due to a collision and as such, still presents the possibility of machine, or tooth, damage.

It is an object of the present invention to provide a method by which machine or tooth damage due to direct or offset topland collisions are reduced or eliminated by the avoidance of force build-up even in the event of such collisions.

SUMMARY OF THE INVENTION

The present invention is directed to a method of bringing members of a gear pair (i.e. gear member and pinion member) into mesh with one another without causing damage to either or both members. Each of the members of the gear pair has an axis of rotation and a plurality of teeth with respective topland surfaces with at least one of the members having teeth, and thus toplands, extending lengthwise at an angle with respect to the axis of rotation of the member.

The method comprises moving one member of the gear pair relatively toward the other member of the gear pair along a meshing path which includes relative movement along (1) a sliding path oriented in the direction of the angle of the toplands and (2) an axial path in the direction of the gear axis whereby upon contact between any topland surfaces of the members, rotation of at least one of the members will result thus enabling the teeth to be relatively positioned so that meshing occurs.

Prior to moving along the meshing path, the present invention includes positioning the members in an initial spaced apart face-to-face relationship and relatively moving them to a pre-mesh position, the movement to the pre-mesh position being oriented along a path directed opposite to the sliding path.

The method further contemplates rotating at least one of the members simultaneously with the relative movement along the meshing path.

DETAILED DESCRIPTION OF THE PREFERRED EMBODIMENT

The present invention will now be discussed with reference to the preferred embodiments as illustrated in the accompanying drawings.

Figure 1:
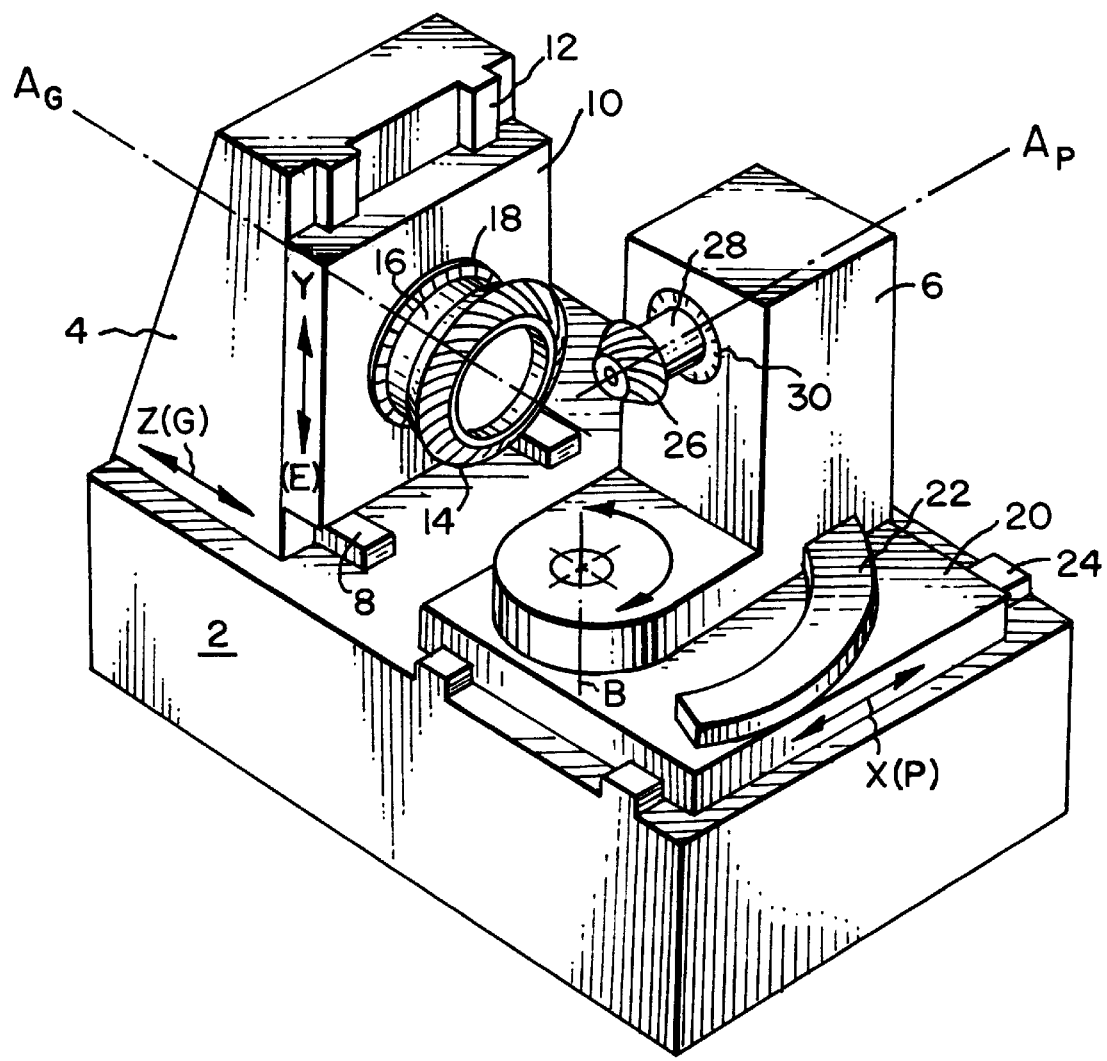
FIG. 1 is a schematic representation of a gear processing machine in which a gear pair is brought into mesh prior to processing.

FIG. 1 illustrates an example of a known type of CNC multi-axis gear testing machine as referred to above. The machine comprises a base 2, gear head 4 and pinion head 6. Gear head 4 is movable along the length of base 2 (Z-axis) via ways 8 attached to the base and includes a slide 10 movable perpendicular (Y-axis) to the base 2 via ways 12 attached to gear head 4. Ring gear 14 is mounted for rotation about its axis, $A_G$, to spindle 16 which in turn is positioned in and movable with slide 10. Encoder means 18 is included on gear spindle 16.

Pinion head 6 positioned on table 20 and is pivotable about the B-axis by movement along an arcuate path via way 22. In turn, table 20 is movable along the width of base 2 (X-axis) via ways 24. Pinion member 26 is mounted for rotation about its axis, $A_P$, to spindle 28 which is positioned pinion head 6. Encoder means 30 is included on pinion spindle 28.

Movement of the gear head 4, slide 10, pinion head 6, table 18, as well as the gear spindle 16 and pinion spindle 28 is imparted by separate drive motors (not shown). The above-named components are capable of independent movement with respect to one another or may move simultaneously with one another. Each of the respective drive motors is associated a feedback device such as a linear (not shown) or rotary encoder (18, 30), or transducer, as part of a CNC system which governs the operation of the drive motors in accordance with instructions input to a computer controller (not shown).

In testing (or lapping) processes, relative movement along the Y and X axes effect positional changes in the contact pattern of the members of the gearset, in effect modifying the contact pattern. Lapping involves rotating the gear members in mesh with contact at a desired position on the tooth surfaces. Thus, the members are located at particular Y and X axes positions along with a particular Z axis position to effect the desired backlash.

Typically, the Y, X, and Z axes movements each have an effect on both the lengthwise and depthwise position of the localized tooth contact pattern, the primary effect of the X-axis movement being on the relative lengthwise position of the contact pattern, the primary effect of Y-axis movement being on the relative depthwise position of the contact pattern, and the primary effect of Z-axis movement being on the backlash. As Y and X axes positions are changed to effect desired shifting, the Z-axis position must also be changed to maintain the desired backlash.

Figure 2:
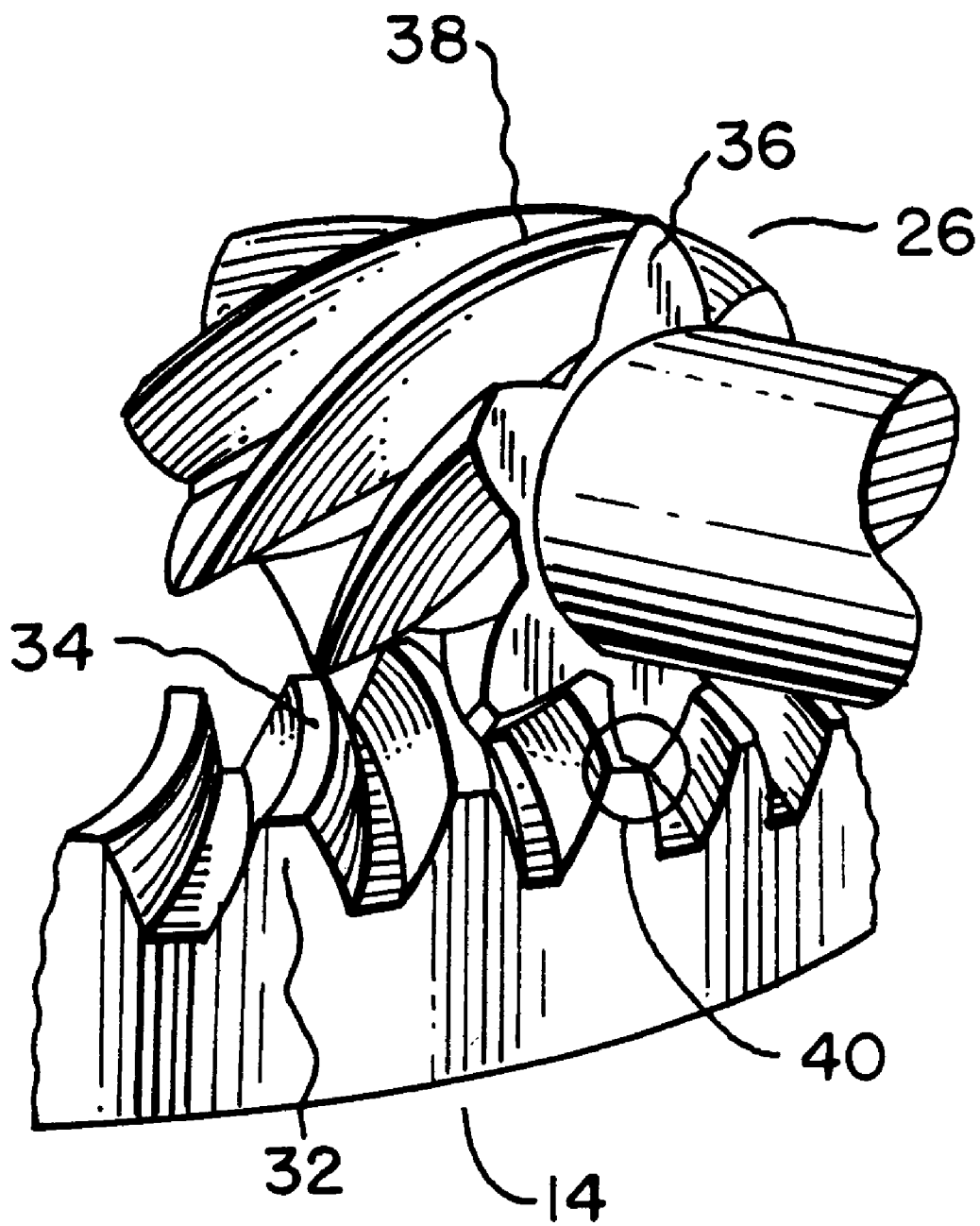
FIG. 2 shows the collision of gear tooth toplands of a bevel gear pair.

FIG. 2 illustrates a collision between a ring gear 14 and its mating pinion 26 as an attempt is made to bring them into mesh. Ring gear 14 comprises a plurality of teeth of which one is shown at 32 with each tooth having a topland 34. In a like manner, pinion 26 comprises a plurality of teeth of which one is shown at 36 with each tooth having a topland 38. As ring gear 26 and pinion 26 are brought together, a collision of their respective toplands occurs as shown at 40. It can be seen this collision is of the previously described offset type in which chipping of the teeth is likely if the gears are hardened, or, if the gears are in the soft condition, plastic deformation of the topland edges may occur.

The present inventive method provides for bringing members of a gear pair together into mesh wherein even if a topland collision occurs, the collision itself will effect rotation of at least one member of the gear pair to relatively position the members of the gear pair so that meshing will then occur.

The method of the present invention is applicable to all gear pairs wherein at least one of the members of the pair includes teeth which extend at an angle to the axis of rotation of the respective member. In other words, at least one member of the gear pair must have teeth which do not extend parallel to its axis of rotation.

Prior to the inventive method, the angle between the ring gear axis, $A$, and pinion axis, $A_P$, is set (usually 90° for most bevel and hypoid gear sets) by appropriately positioning the pinion head 6 about the B-axis (FIG. 1). The ring gear 14 and pinion 26 are initially aligned face-to-face in their running position (i.e. build position) on the X and Y axes except that their toplands are separated by a distance, d, along the ring gear axis $A_G$ (Z-axis). This positioning is shown by the pinion designated at 26' by dashed lines in FIG. 3 and the distance, d, between the toplands is usually about 1–5 mm, preferably 2 mm. It is this position from which meshing is carried out in the previously discussed prior art processes by merely in-feeding of either member along the ring gear axis $A_G$.

Figure 3:
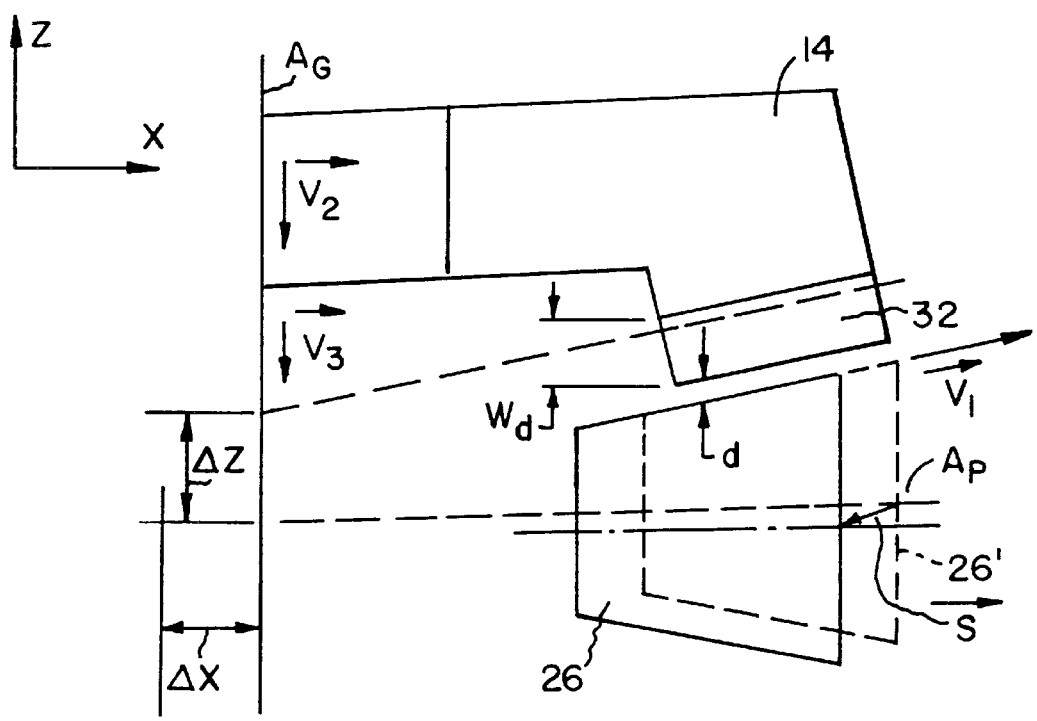
FIG. 3 is a top cross-sectional view of a gear pair illustrating the inventive meshing method.
Figure 4:
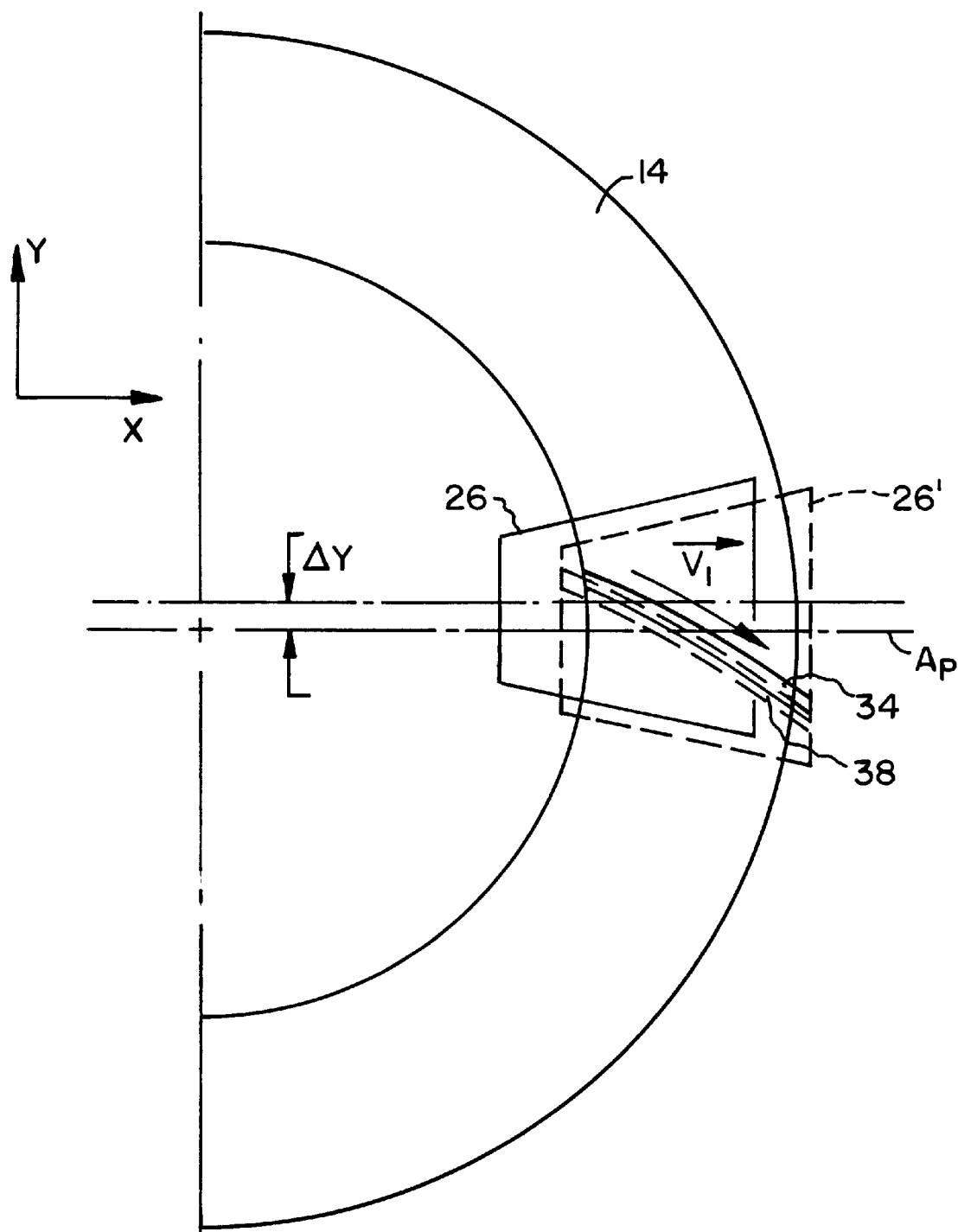
FIG. 4 is an end cross-sectional view of a gear pair meshing according to the present invention.

However, in the present invention, from the above-described prior art position, the ring gear 14 and pinion 26 are first relatively positioned in a pre-mesh position as shown by the solid-line pinion designated by 26 in FIG. 3 and are then fed relative toward one another along vector $\overrightarrow{v}$ in the direction of the ring gear axis $A_G$ and also along an angular meshing path vector $\overrightarrow{v}$ which is angularly oriented in the lengthwise direction of the tooth toplands 34, 38 (see FIG. 4). The angular direction is preferably determined at the midpoint of the toplands and is tangent to the midpoint of the ring gear tooth. The angle of the tooth lengthwise direction is equivalent to the spiral angle of the tooth at the midpoint of the tooth.

It is necessary to define a vector, hereafter referred to as sliding position vector $S_1$ which sets forth the path of travel to the pre-mesh position whereby the members of the gear pair will mesh according to the inventive paths $\overrightarrow{v_1}$ and $\overrightarrow{v_2}$. While the axes of many lapping and testing machines have typically been designated by P, E and G as shown in parentheses in FIG. 1, the present invention will be discussed with reference to an X, Y, Z coordinate system since these coordinate systems are frequently referred to on most computer-controlled multi-axis machines.

In the present invention, the ring gear and pinion are initially positioned with respect to one another in the above-described meshing position, separated by distance d. In the following discussion, axes positions x, y and z may be measured with respect to any desired point of reference such as, for example, the apex of the pitch cone. The initial axes positions $(x_i, y_i, z_i)$ are described by the following relationships:

$$x_i = x_0$$

where $x_0$=X-axis position at the build position $$y_i = y_0$$

where $y_0$=Y-axis position at the build position $$z_i = z_0 + w_d + d$$

where
- $z_0$=Z-axis position at the build position
- $w_d$=whole depth of teeth (in gear axis direction)
- d=distance between toplands before meshing procedure starts.

From the above initial positions, the gear members are positioned relative to one another in the pre-mesh position (i.e. start position) as shown by pinion 26 in FIG. 3. This position is arrived at by moving from the initial positions to the pre-mesh positions according to sliding position vector S which relatively positions the ring gear and pinion whereby they may subsequently mesh while avoiding damaging topland collisions. Sliding position vector S is equal to the magnitude of vector $\vec{v}_1$ (multiplied by the time for meshing) but extends in the opposite direction. The components of the sliding position vector S are defined as:

$$s_x = 0.1 * F$$

where

F=face width of the ring gear;

$$s_z = -0.1 * F \frac{n_p}{n_g}$$

where
- F=face width of ring gear
- $n_p$=number of teeth on pinion
- $n_g$=number of teeth on ring gear $$s_y = \pm \tan\left\{\left[\beta_G + \arcsin\left(\frac{h}{\frac{D_{m2}}{2}}\right)\right]\right\} * 0.1 * F \sqrt{1 + \frac{n_p^2}{n_g^2}}$$

where
- + for right hand pinion
- − for left hand pinion
- F=face width of ring gear
- $n_p$=number of teeth on pinion
- $n_g$=number of teeth on ring gear
- $\beta_G$=spiral angle of ring gear (positive for left and right hand gear)

$D_{m2}$=ring gear mean diameter h=hypoid offset

Hence, the pre-mesh positions $(x_p, y_p, z_p)$ may now be defined by:

$$x_p = x_0 - s_x$$

$$y_p = y_0 - s_y$$

$$z_p = z_i - s_z$$

Figure 6:
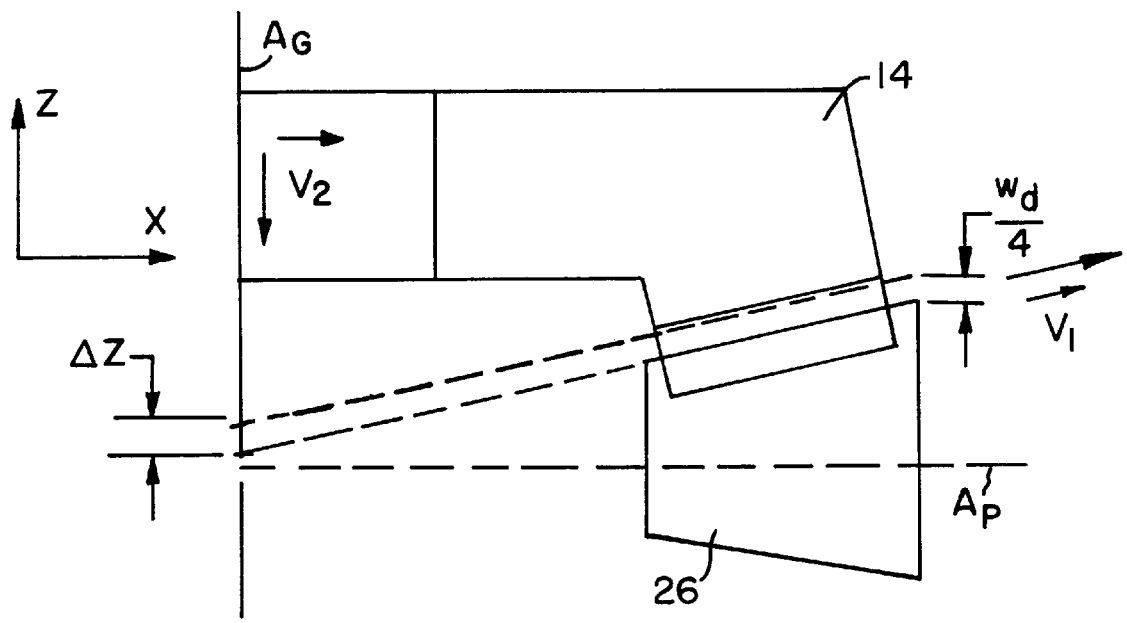
FIG. 6 is a top cross-sectional view of a gear pair in mesh resulting from the inventive method.

Once the pre-mesh positions are attained, the ring gear and pinion are moved relatively to the mesh position along $\vec{v}_1$ (sliding path) and $\vec{v}_2$ (axial path) as shown in FIG. 6. The mesh positions $(x_m, y_m, z_m)$ are defined by:

$$x_m = x_0$$

$$y_m = y_0$$

$$z_m = z_0 + w_d/4$$

Thus, it can be seen that $\vec{v}_2$ to achieve meshing may be defined as:

$$|\vec{v}_2| = \frac{\frac{3w_d}{4} + d}{(\text{meshing time})}$$

Relative movement between the members of a gear pair along the angular sliding path $\vec{v}_1$ together with infeeding along axial path $\vec{v}_2$ along the gear member axis results in rotation of one member relative to the other in the event of a collision of the toplands. This is due to the angular direction of the meshing feed path $\vec{v}_1$ and the angle of the tooth toplands. If toplands collide, they effectively glide along one another and their relative motion causes rotation of one member whereby a tooth slot quickly becomes aligned with a mating tooth. Thus, meshing is accomplished.

Figure 7:
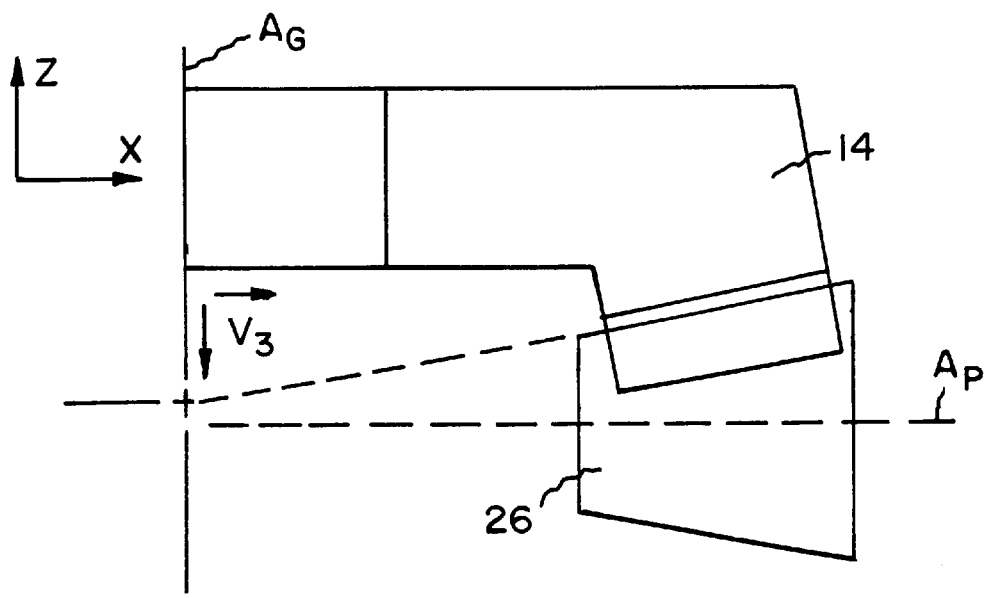
FIG. 7 is a top cross-sectional view of a gear pair positioned in the build position.

Once the gear members are in mesh, any remaining infeeding to the proper depth to achieve the build position, $z_0$, along the Z-axis may continue in the direction of vector $\vec{v}_3$ (FIG. 7) which is in the same direction as $\vec{v}_2$ along the ring gear axis $A_G$ (i.e. along the Z-axis). Thus:

$$z_0 = z_m - w_d/4$$

Figure 5:
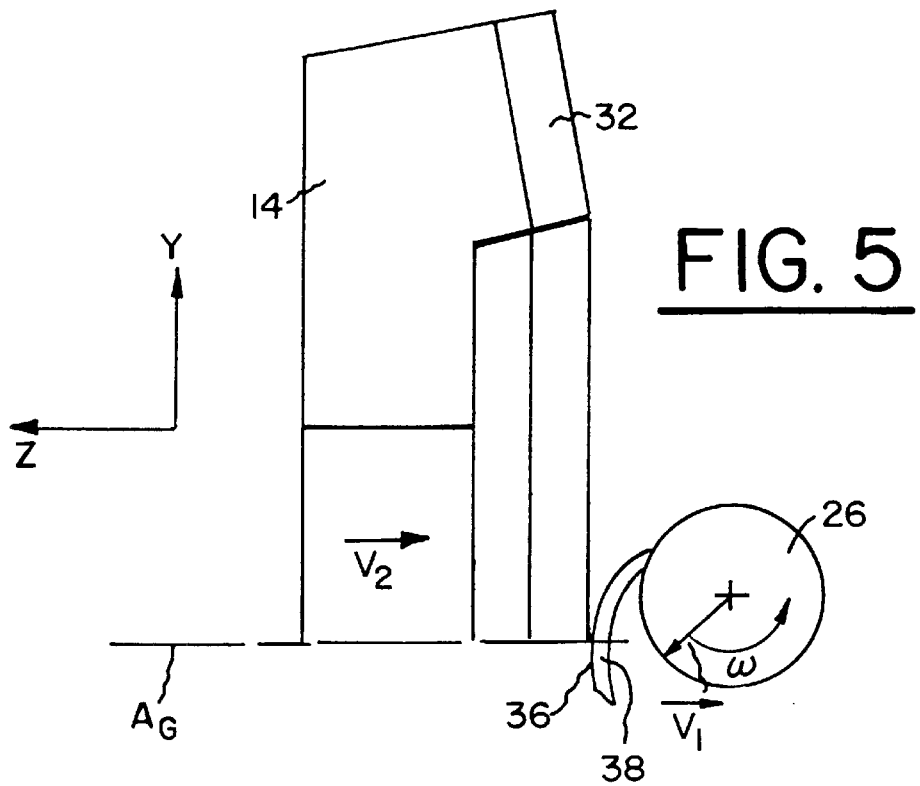
FIG. 5 is a side cross-sectional view of a gear pair meshing according to the present invention with the resulting rotation of one of the gear members.

The present invention may also include a rotation of one member, preferably the pinion, as meshing along $\vec{v}_1$ takes place. In FIG. 5 the additional pinion rotation is designated by ω). This additional rotation is preferably slow (e.g. 5 RPM) and takes place in the positive (drive) direction on the pinion. It should be noted that the drive direction is determined based on the concave surface of the pinion teeth driving the convex side of the ring gear teeth. This additional rotation is beneficial in the event of a direct topland-to-topland collision since it causes a rotation of the ring gear as the same time as the sliding contact occurs between the toplands. The rotation turns the ring gear slots away from their original positions and the angular movement due to feeding in the $\vec{v}_1$ direction frees the pinion topland from the direct collision and the pinion tooth slips into the next tooth slot (with respect to pinion rotation) of the ring gear.

While the present invention has been described with respect to a bevel gear pair, the invention is not limited thereto. As stated above, the present invention is applicable to meshing of any gear set members as long as at least one of the members has teeth extending in the length direction at an angle that is not parallel to the axis of rotation of the gear. Therefore, the present invention is applicable not only to bevel and hypoid gear pairs, but also to helical gear sets as well.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of bringing a gear member and a pinion member into mesh with one another, each of said members having an axis of rotation and a plurality of teeth with respective topland surfaces and wherein the toplands of at least one of said members extend lengthwise at an angle with respect to the axis of rotation of said member, said method comprising:

moving said gear and pinion members relatively toward one another along a meshing path to bring said members into mesh, said meshing path including relative movement along (1) a sliding path oriented in the direction of said angle of the toplands, and (2) an axial path in the direction of the gear axis, whereby upon contact between any topland surfaces of said members, rotation of at least one of said members results thus enabling said teeth to be relatively positioned so that meshing occurs.

2. The method of claim 1 further comprising:

rotating at least one of said members simultaneously with said moving along the meshing path.

3. The method of claim 1 wherein the angular sliding path is established with respect to the midpoint along the lengthwise direction of said toplands.

4. The method of claim 1 wherein the angle of said sliding path equals the spiral angle of a tooth of one of the members at a midpoint along the tooth.

5. The method of claim 2 wherein said gear pair comprises a ring gear member and a pinion member and wherein said pinion member is rotated.

6. The method of claim 2 where said rotating is effected at a speed of about 5 revolutions per minute.

7. The method of claim 1 wherein said gear pair comprises a spiral bevel gear pair.

8. The method of claim 1 wherein said gear pair comprises a hypoid gear pair.

9. The method of claim 1 wherein said method is performed prior to a testing or lapping process.

10. The method of claim 1 wherein said method is performed on a testing or lapping machine.

11. The method of claim 1 wherein prior to said moving along said meshing path, said members are positioned in an initial spaced apart face-to-face relationship and moved to a pre-mesh position, the movement to the pre-mesh position being oriented along a path directed opposite to said sliding path.

12. The method of claim 11 wherein the movement to said spaced pre-mesh position is along a sliding position vector S starting at the initial position having components x, y, z defined by:

$$s_x = 0.1 * F$$

where F=face width of the gear member $$s_z = -0.1 * F \frac{n_p}{n_g}$$

where

F=face width of the gear member $n_p$=number of teeth on the pinion member $n_g$=number of teeth on the gear member $$s_y = \pm \tan\left\{\left[\beta_G + \arcsin\left(\frac{h}{\frac{D_{m2}}{2}}\right)\right]\right\} * 0.1 * F \sqrt{1 + \frac{n_p^2}{n_g^2}}$$

where

+ for right hand pinion

− for left hand pinion

F=face width of the gear member $n_p$=number of teeth on the pinion member $n_g$=number of teeth on the gear member $\beta_G$=spiral angle of the gear member (positive for left and right hand)

$D_{m2}$=gear member mean diameter h=hypoid offset.

13. The method of claim 11 wherein said members are spaced apart by a distance of 1–5 mm.

14. The method of claim 1 wherein subsequent to the movement along said meshing path, the members are relatively moved additionally to a build position.

15. A method of bringing a gear member and a pinion member into mesh with one another, each of said members having an axis of rotation and a plurality of teeth with respective topland surfaces and wherein the toplands of at least one of said members extend lengthwise at an angle with respect to the axis of rotation of said member, said method comprising:

moving said gear and pinion members relatively toward one another along a meshing path to bring said members into mesh, said meshing path including relative movement along (1) a sliding path oriented in the direction of said angle of the toplands, and (2) an axial path in the direction of the gear axis, and, rotating at least one of said members simultaneously with the movement along said meshing path, whereby upon contact between any topland surfaces of said members, rotation of said other member will result thus enabling said teeth to be relatively positioned so that meshing occurs.

16. The method of claim 15 wherein said gear pair comprises a ring gear member and a pinion member and wherein said pinion member is rotated.

17. The method of claim 15 where said rotating is effected at a speed of about 5 revolutions per minute.

18. The method of claim 15 wherein said gear pair comprises a spiral bevel gear pair.

19. The method of claim 15 wherein said gear pair comprises a hypoid gear pair.

20. The method of claim 15 wherein said method is performed prior to a testing or lapping process.

21. The method of claim 15 wherein said method is performed on a testing or lapping machine.

22. The method of claim 15 wherein prior to said moving along said meshing path, said members are positioned in an initial spaced apart face-to-face relationship and moved to a pre-mesh position, the movement to the pre-mesh position being oriented along a path directed opposite to said sliding path.

23. The method of claim 22 wherein the movement to said spaced pre-mesh position is along a sliding position vector S starting at the initial position having components x, y, z defined by:

$$s_x = 0.1 * F$$

where F=face width of the gear member;

$$s_z = -0.1 * F \frac{n_p}{n_g}$$

where

F=face width of the gear member $n_p$=number of teeth on the pinion member $n_g$=number of teeth on the gear member $$s_y = \pm \tan\left\{\left[\beta_G + \arcsin\left(\frac{h}{\frac{D_{m2}}{2}}\right)\right]\right\} * 0.1 * F \sqrt{1 + \frac{n_p^2}{n_g^2}}$$

where

+ for right hand pinion

− for left hand pinion

F=face width of the gear member $n_p$=number of teeth on the pinion member $n_g$=number of teeth on the gear member $\beta_G$=spiral angle of the gear member (positive for left and right hand)

$D_{m2}$=gear member mean diameter h=hypoid offset.

24. The method of claim 15 wherein subsequent to the movement along said meshing path, the members are relatively moved additionally to a build position.

* * * * *